UNITED STATES PATENT OFFICE.

SOLOMON GANELIN, OF PHILADELPHIA, PENNSYLVANIA.

METHOD OF MAKING OXYSALTS OF LEAD FROM LEAD SULFATE AND LEAD CHLORID.

SPECIFICATION forming part of Letters Patent No. 587,808, dated August 10, 1897.

Application filed August 26, 1895. Renewed May 4, 1897. Serial No. 635,078. (No specimens.)

*To all whom it may concern:*

Be it known that I, SOLOMON GANELIN, a subject of the Czar of Russia, and a resident of Philadelphia, in the county of Philadelphia and State of Pennsylvania, have invented certain new and useful Improvements in the Manufacture of Oxysalts of Lead from Lead Sulfate and Lead Chlorid, of which the following is a specification.

In order that the nature and objects of my invention may be fully understood, reference will be made to methods of manufacture hitherto employed or suggested for the production of oxysalts of lead. The general method of preparing any oxysalt of lead by the wet process was to employ any soluble oxysalt of lead—for example, oxynitrate or oxyacetate—and to add to it a soluble salt of the acid required. This general method may be expressed by the following equations:

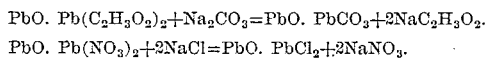

In addition to this general method of producing oxysalts of lead there are other methods for producing by the wet process oxychlorids and oxysulfates of lead. For example, oxychlorid of lead was made by mixing finely-ground lead oxid and sodium chlorid in the presence of water. The reaction which took place is well expressed by the following equations, in which X represents an unknown and variable quantity.

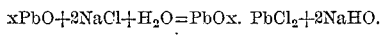

However, the result of this reaction was not the production of the definite chemical compound $PbO.PbCl_2$, but of a much more basic oxychlorid of lead of an indefinite chemical composition—such, for example, as $5PbO.PbCl_2$ $7PbO.PbCl_2$, &c.

To produce the definite chemical compound $PbO.PbCl_2$, Pattison suggested and introduced another method of procedure. According to this method of Pattison's lead chlorid is first brought into solution, and to this solution is added a solution of hydroxid of alkaline and earth-alkaline metals in a quantity not exceeding half of the equivalent weight of the lead chlorid employed. By proceeding in this manner it is possible, though practically very difficult, to obtain the definite chemical compound $PbO.PbCl_2$, which should be thrown down as a precipitate of snow-white color. However, in practice, and especially on a commercial scale, it is very difficult to obtain by this method white oxychlorid of lead of definite chemical composition. To accomplish this result, many well-known and complicated conditions have to be complied with; otherwise the white color and definite chemical composition are not obtained in the resultant product. Among these essential and disadvantageous conditions which render the Pattison process uncertain and unreliable and commercially undesirable the following may be mentioned. First, lead chlorid and metallic oxid or hydroxid must be employed as solutions, and the lead chlorid must be employed in excess, and, second, the solution of lead chlorid must be added to the solution of oxid or hydroxid. By neglecting any of these essential conditions lead oxychlorid obtained is invariably of a yellow color, because by neglecting these conditions some part of the lead chlorid will come in contact with a quantity of the base exceeding its half equivalent weight, and in such case the lead chlorid is converted into a higher basic oxychlorid, which is of a yellow color.

The foregoing methods of making oxychlorid of lead are not applicable for making oxysulfate of lead from lead sulfate, because sulfate of lead is insoluble in water and because the hydroxids of alkaline earths could not be employed for producing oxysulfates of lead from lead sulfate for the reason that the alkaline-earth sulfates are insoluble in water, so that the oxysulfate of lead would be mixed with the sulfate of the alkaline-earth metals. However, one method for producing lead oxysulfate from lead sulfate by boiling it with sodium hydroxid was patented by Bronner, July 1, 1890, but the basic salt formed by this method is an undetermined chemical compound and its basicity is directly proportional to the quantity of sodium hydroxid employed, so that according to the amount of the base employed an endless series of oxysalts may be formed whose composition may lie between $PbSO_4$ and $PbO$. The foregoing statement is equally true when oxychlorid of lead is produced from lead chlorid and the bases of alkaline and alkaline-earth metals. In the latter case, however, the series of oxychlorids may lie between PbO.PbCl$_2$ and PbO.

The principal objects of my present invention are, first, to provide a simple, expeditious, reliable, commercial, and practical method of producing oxychlorid of lead and oxysulfate of lead of the definite chemical composition PbO.PbSO$_4$ and PbO.PbCl$_2$ without the necessity of bringing the lead salts and the metallic oxid into solution, and, second, to provide a general method of manufacturing any oxysalts of lead of one or more than one acid radical from lead sulfate.

My invention consists of the improvements hereinafter described and claimed.

According to my invention I obtain oxychlorid of lead and oxysulfate of lead of the definite chemical composition PbO.PbSO$_4$, and PbO.PbCl$_2$ by using as a base magnesium oxid, (MgO,) which differs radically and in every respect from all bases which have hitherto been employed. For example, it is immaterial whether the quantity of magnesium oxid employed is more or less than half the equivalent weight of lead chlorid used. In whatever proportions the magnesium oxid and lead chlorid or lead sulfate are taken the definite chemical compound PbO.PbSO$_4$ or PbO.PbCl$_2$ is invariably formed. If the quantity of magnesium oxid exceeds half the equivalent weight of lead chlorid or lead sulfate, the excess of magnesium oxid remains unattacked. Similarly if the quantity of lead salt exceeds double the equivalent weight of magnesium oxid the excess remains unattacked, and in all cases the oxysalts PbO.PbSO$_4$ and PbO.PbCl$_2$ are formed. Moreover, it is unnecessary to bring either the magnesium oxid or the lead salt into solution, because magnesium oxid in the solid state reacts upon the lead salts in a similar state and produces snow-white oxychlorid of lead of definite chemical composition.

To carry my improved method into effect, I take lead sulfate or lead chlorid and mix or stir it with half of its equivalent weight of oxid or hydroxid of magnesium, and I stir this mixture in the presence of sufficient water to form a paste. I then add more water, with the result that the following reaction takes place:

(1) 2PbSO$_4$+MgO=PbO.PbSO$_4$+MgSO$_4$.

(2) 2PbCl$_2$+MgO=PbO.PbCl$_2$+MgCl$_2$.

However, it must be borne in mind that for the reasons stated the quantities of magnesium oxid and lead salt referred to in the equation need not be adhered to, but may be increased or diminished without changing the white color and definite chemical composition of the resultant oxysalts.

To manufacture other oxysalts of lead from lead sulfate, I take lead sulfate and intimately mix or stir it with half of its equivalent weight of oxid or hydroxid of a base more basic than lead in the presence of water and of a salt of the desired acid radical. Upon the completion of the ensuing reaction there will be formed, dependent upon the salt used, an oxysalt of lead containing an acid radical of the particular salt used. The foregoing may be more clearly expressed by means, for example, of the following equations:

(1) 2PbSO$_4$+MgO+4NaCl=PbO.PbCl$_2$+2Na$_2$SO$_4$+MgCl$_2$.

(2) 2PbSO$_4$+3NaHO+NaHCO$_3$=PbCO$_3$.Pb(OH)$_2$+2Na$_2$SO$_4$+H$_2$O.

(3) 4PbSO$_4$+3MgO+Na$_2$Cr$_2$O$_7$+2H$_2$O=2(PbCrO$_4$.Pb(OH)$_2$+3MgSO$_4$+Na$_2$SO$_4$.

In the first equation the salt used is common salt, (NaCl,) and in such case oxychlorid of lead is formed. In the second equation the salt used is a carbonate, preferably sodium carbonate, and in such case oxycarbonate of lead is formed, and in the last equation the salt used is a chromate, preferably bichromate of sodium, and in such case oxychromate of lead is formed. Instead of obtaining an oxysalt of lead of one acid radical I may obtain an insoluble oxysalt of lead containing more than one acid radical. To effect this result, I use in addition to the lead sulfate and a base, the salts of the acid radicals desired. Consequently there is formed, dependent upon the salts used, an oxysalt of lead containing acid radicals of the salts used. For the sake of a further description reference may be made to the following equations, which are descriptive of my invention:

(1) 3PbSO$_4$+2NaHO+2NaCl+Na$_2$CO$_3$=PbCO$_3$.PbCl$_2$.Pb(OH)$_2$+3NaSO$_4$.

(2) 4PbSO$_4$+2NaOH+2NaCl+2Na$_2$CO$_3$=Pb(OH)$_2$.PbCl$_2$.2PbCO$_3$+4Na$_2$SO$_4$.

From the foregoing five equations it will be apparent that the salts and hydroxid used may be taken in different proportions, having reference to the equivalent weight of the lead sulfate employed, and while I have given five examples of the reactions of lead sulfate in the presence of water, a base, and salts it must be understood that any salts whose acid radical forms an insoluble salt with lead may be employed in lieu of the particular salts which I have mentioned.

In pursuance of my invention I may produce oxychlorid of lead from lead sulfate by the use of lead oxid and an alkaline chlorid by means of a reaction of two phases. The reaction, considered as a whole, is fully shown by the following equations:

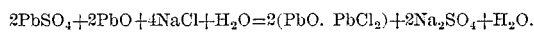

At first the lead oxid reacts with the alkaline salts according to the following equations:

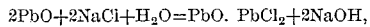

and the alkaline hyroxid thus formed reacts according to be following equation, which is the one above given:

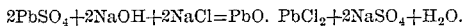

It may be remarked that in cases where I desire to form an oxychlorid of lead from an impure sulfate of lead in which a metallic oxid is present in sufficient quantity to convert all the lead sulfate into oxychlorid I simply apply sodium chlorid directly to the impure lead sulfate without using any metallic oxid other than that present in the impure sulfate. In practice I have used sulfate of lead in which oxid of zinc and oxid of lead were present in such quantities that it was not necessary to add more oxid, it being sufficient to add chlorid of sodium. In the same manner I have obtained oxychlorocarbonate of lead from lead sulfate which contained the oxids of zinc and lead, and which is known as "sublimed lead," by grinding such sublimed lead with sodium chlorid and sodium carbonate in the presence of water.

I would state that I do not intend to limit my invention to the exact conditions of the reactions as expressed by the foregoing equations or to the exact proportions therein set forth, because they are intended to be general. Moreover, the proportions and relations of the lead compounds will vary according to their method of preparation and according to the amount of oxid used, and also according to the character and quality of the added salt or salts.

Having thus described the nature and objects of my present invention, what I claim as new, and desire to secure by Letters Patent, is—

1. The herein-described method of making the definite chemical compounds $PbO.PbSO_4$ and $PbO.PbCl_2$ from normal lead sulfate and lead chlorid which consists in mixing the insoluble solid normal lead salt with any proportion of insoluble solid magnesium oxid or hydroxid in the presence of water, substantially as described.

2. The herein-described method of making oxysalts of lead from lead sulfate which consists in treating lead sulfate in the presence of water and an oxid of a metal more basic than lead with a salt of which the acid radical forms insoluble salts with lead.

3. The herein-described method of forming lead oxysalts of more than one acid radical from lead sulfate which consists in treating lead sulfate in the presence of water and an oxid of a metal more basic than lead with salts having the desired acid radicals which form insoluble salts with lead.

4. The herein-described method of converting all the lead present in an uncombined mixture of lead oxid and lead sulfate into oxychlorid of lead by means of sodium chlorid and water, which consists in mixing said ingredients in sufficient quantities for effecting the following reactions: first, the conversion of the lead oxid into oxychlorid and the consequent formation of hydroxid of sodium and second the conversion of the lead sulfate by means of said sodium hydroxid and the free sodium chlorid present into oxychlorid of lead, substantially as described.

In testimony whereof I have hereunto signed my name in the presence of two witnesses.

SOLOMON GANELIN.

Witnesses:
   A. B. STOUGHTON,
   A. M. LEWIS.